No. 827,865. PATENTED AUG. 7, 1906.
M. HARRIS & J. F. DEARING.
BALL BEARING.
APPLICATION FILED JUNE 9, 1905.
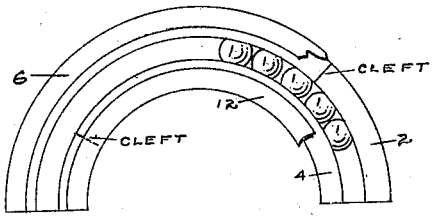
FIG. 1.
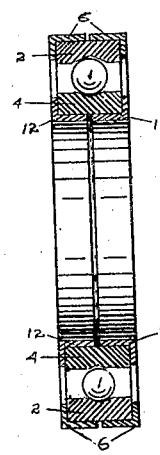 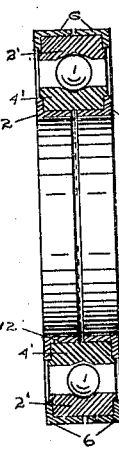 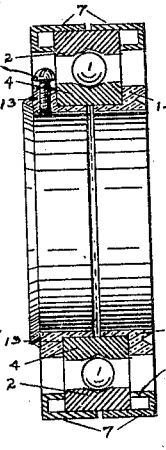 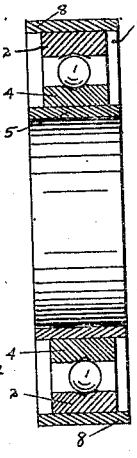 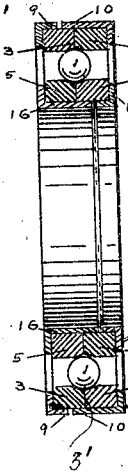 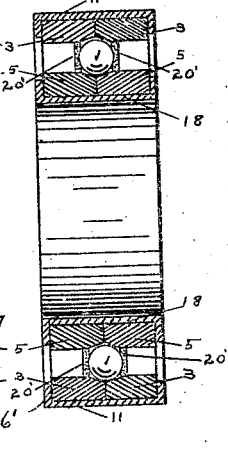
FIG. 2.  FIG. 3.  FIG. 4.  FIG. 5.  FIG. 6.  FIG. 7.
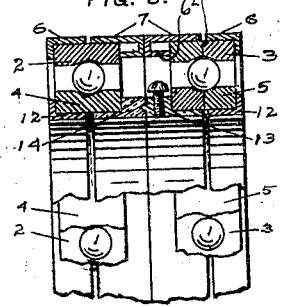 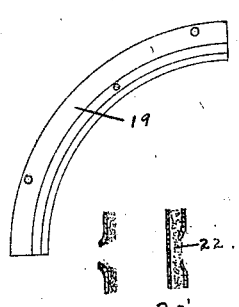 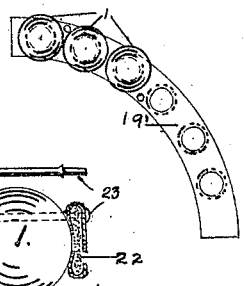 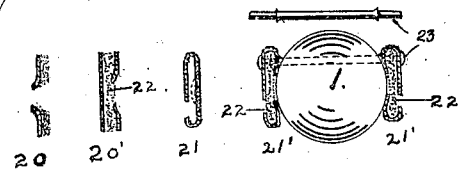
FIG. 8.  FIG. 9.  FIG. 10.  FIG. 11.
WITNESSES:
A. E. Anderson
E. C. Johnson
INVENTORS
Milo Harris
John F. Dearing
BY Milo Harris
ATTORNEY

UNITED STATES PATENT OFFICE.

MILO HARRIS AND JOHN F. DEARING, OF JAMESTOWN, NEW YORK.

BALL-BEARING.

No. 827,865.　　　Specification of Letters Patent.　　　Patented Aug. 7, 1906.

Application filed June 9, 1905. Serial No. 264,509.

*To all whom it may concern:*

Be it known that we, MILO HARRIS and JOHN F. DEARING, citizens of the United States, residing in the city of Jamestown, in the county of Chautauqua and State of New York, have invented a new and useful Improvement in Ball-Bearings, of which the following, taken in connection with the accompanying drawings, is a full, clear, and exact description.

The invention relates to that class of ball-bearings commonly known as the "unit" or "annular" type, in which the balls preferably move in four-point races between hardened-steel race-rings; and the objects of our invention are, first, to provide an untempered housing for the steel race-rings, which forms a bearing between adjacent rings and between the casing or journal and the rings and which eliminates the necessity of grinding the hardened race-rings, except in the races or grooves for the balls, and lessens the liability of breakage of the tempered race-rings or balls; second, to provide means to prevent the housings and race-rings from creeping, and, third, to provide a ball-retainer that will prevent the balls from rubbing against one another, will prevent noise, and will lubricate the balls. In ball-bearings of this type having inner and outer tempered-steel race-rings the rings must be made accurate by grinding not only the ball-race, but also the outer sides of the rings, in order that they may be concentric with the race; also, where used in multiple or groups the edges must be ground in order that they may have an accurate bearing on one another. Herein lies a large percentage of the cost of manufacture, as no matter how true the rings may be made before tempering they are liable to spring or warp during the hardening process. Our housings for the race-rings eliminate the necessity of grinding of the outer surfaces and edges of the rings In the drawings, Figure 1 is a side elevation of the half-section of a unit-bearing, showing the inner and outer housings on the cleft race-rings, the housings being broken away at one end. Fig. 2 is a sectional view of the unit-bearing, showing the housing formed as double corner-bands for the outer and inner surfaces. Fig. 3 is a sectional view showing the race-rings recessed to receive the bands. Fig. 4 is a sectional view showing the manner of extending the bands longitudinally, an annular tongue and groove for interlocking the inner rings, and a set-screw in the housing to prevent the inner rings from creeping around the shaft. Fig. 5 is a sectional view of a ball-bearing, showing a modification of the housing, consisting of flat extension-bands around the outer ring and within the inner ring. Fig. 6 is a sectional view of a bearing, showing the race-rings formed with an annular cleft and the housing-bands of different widths to cover said annular joint. Fig. 7 is a sectional view showing the race-rings with an annular cleft and the cornered or angular housing in one piece, also showing the ball-retainer in position each side of the ball. Fig. 8 is a sectional view of two unit-bearings, showing the interchangeable use of the different forms of housing in a multiple bearing. Fig. 9 is a side elevation of the outer face of a section of the ball-retainer, and Fig. 10 is a like elevation of the inner face with balls in part of the seats. Fig. 11 shows a number of sectional views of the ball-retainer and the felt lining for holding the oil and distributing it to the balls.

Similar numerals refer to corresponding parts in the several views.

The numeral 1 indicates the balls.

The numeral 2 indicates the outer or casing race-ring, and the numeral 4 the inner or journal race-ring. Rings 2 and 4 may be made in two parts 3 and 5, with a central annular cleft 3′, which arrangement easily admits the balls to the races. The balls run in a four-point bearing between rings 2 and 4 in races which are preferably ground at a low or flat angle. It is much easier and cheaper, however, to make the race-rings with a crosswise cleft, as shown in Fig. 1, which crosswise cleft does not injure the race for the balls. The crosswise cleft forms a spring race-ring which easily admits the balls to the race in assembling the bearing. Race-rings with either the annular or crosswise clefts can be used with our housing. It would not depart from our invention to make rings 2 and 4 solid or without clefts, as a solid ring can also be held by the housing without grinding.

After the insertion of the balls in the races between the race-rings, preferably by means of the spring-ring, said rings are confined and held to a fit on the balls by means of housings or bands. This fit is sufficient to press the race-ring with tension, yet not with excessive friction. The housing is preferably made of angular bands or cornered rings 6 and 12 for rings 2 and 4. Outer bands 6 are pressed tightly onto the outer corners of the outer rings, and bands 12 are in like manner pressed onto inner corners of the inner rings. Bands 6 and 12 are preferably made in two parts for convenience in pressing them onto the race-rings; but the forming of the band in one piece, as shown at 8 or 11 in Figs. 5 and 7, would not depart from our invention, since the making of the bands 6 with the annular cleavage between the bands is only for convenience in manufacture. The main improvement which we desire to protect is the extension 6' of the housing or bands 6 7 8 9 10 11 beyond the edges of the race-rings in order that they may be trued up in the lathe. The bands extend over the outer or inner faces of the outer and inner rings, as shown, and are preferably turned at an angle along the edges of the race-rings, thereby forming extensions 6', as stated. This extension 6' forms a bearing between adjacent rings in multiple or group use of the units, as shown in Fig. 8.

It is apparent that the bands 6 may be extended beyond the edges of the race-ring, as shown at Fig. 7, and the inner edge 6² turned back to bear upon the edge of the race-ring, thereby forming a simple convenient broad extension to the housing. It is obvious also that the two bands may be made unequal in width, as shown at 9 and 10 in Fig. 6, and thereby serve a convenient purpose in covering an annular cleft for housing two race-rings 3 3. The single or solid housing 11 or 18 for the outer and inner race-rings, as shown in Fig. 7, also holds the double rings 3 or 5 firmly in place. It is apparent that one of the extensions 6' can be turned in the band, and it can then be inserted or placed on the race-rings, after which the other flanged extension 6' may be pressed down to the rings by a suitable die.

In order to interlock the housings, it is often expedient to tongue and groove them, as shown at 13 and 14 in Fig. 4; also, in order to keep the inner housings and race-rings from creeping on the shaft a set-screw 13' is inserted through the extension of the housing.

In the modification shown in Fig. 5 the flat rings 8 and 15 would serve our purpose for protecting the outer surface of the outer ring 2 and the inner surface of the inner ring 4 and has the extensions 6' for bearing on the adjacent parts at each side. This would serve a good purpose, but would not be as simple and convenient as the corner-bands 6. It is now apparent that after the bearings and their housings are assembled they may be put into the lathe and enough taken off the housings to bring a number of them into line and to fit them to the journal and casing for which they are designed. At the same time the extensions 6' may be trued up, so that a perfect bearing is formed between the adjacent extensions, at which time also the tongue and groove may be cut, as shown, in bands 13 and 14 when desired. This saves all grinding of the outer parts, the race having been ground before the assembling of the bearing.

The ball-retainer (indicated by numeral 21) is preferably made of a strip of thin sheet metal bent in a flat tubular form about a strip of felt 22 or other suitable material which will hold and convey sufficient oil to the balls to keep them properly lubricated. This felt 22 can readily be removed from retainer 21 for cleansing or renewal without disturbing the other parts of the bearing.

The numeral 20' indicates a modification of the retainer, which is composed of two strips of sheet metal arranged with a strip of lubricating-felt between them. In this form of retainer the metal strips should be held apart at such a distance as will let the oil pass freely through the felt.

In the modification indicated by the numeral 20 the felt has a hole through which the balls pass into the seat of the retainer, the felt being properly secured to one piece. The ball-retainer 21 is held on the opposite sides of the balls by metal studs 23 or other suitable means. The position of the retainers on opposite sides of the balls is shown in Figs. 7 and 11.

Babbitt or fusible metal bands covering just the outer and inner face of the race-rings in ball-bearings have been used, and we disclaim such use.

We claim as new—

1. A roller-bearing ring consisting of a hardened-steel race-ring, and a housing of substantially uniform thickness for said race-ring having extensions beyond the edges of the race-ring.

2. A roller-bearing ring consisting of a hardened-steel race-ring, and cornered housing-bands of substantially uniform thickness for the edges and the ungrooved side of said race-ring.

3. A roller-bearing ring consisting of a hardened cleft-steel race-ring, and a housing of substantially uniform thickness for the edges and ungrooved side of said race-ring.

4. In ball-bearings, hardened-steel casing and journal rings, housings for said rings consisting of untempered bands around the outer face of the casing-ring and the inner face of the journal-ring and extending beyond the edges thereof, and balls between the rings, substantially as described.

5. In ball-bearings, a series of hardened-steel casing and journal race-rings, balls between said casing and journal race-rings, housings covering the outer faces of the casing race-rings and the inner faces of the journal race-rings and extending beyond the edges of said race-rings to form bearings by their contiguous extensions.

6. In ball-bearings, hardened cleft-steel casing and journal race-rings, balls between said journal and casing rings, untempered housings covering the outer faces of the casing-rings and the inner faces of the journal-rings, said housings extending beyond the edges of the rings, and means to secure the journal-housings to the shaft.

7. In ball-bearings, a series of hardened-steel casing and journal race-rings, balls between said case and journal rings, bands around the outer face of the casing-rings and extending beyond the edges thereof, bands around the inner face of the journal-rings and extending beyond the edges thereof, and means for interlocking the adjacent journal-bands.

8. In ball-bearings, a series of hardened-steel casing and journal rings, balls between said rings bands around the outer face of the casing-rings and extending beyond the edges thereof, and bands around the inner face of the journal-rings and extending beyond the edges thereof to form a bearing between contiguous extensions, there being a tongue-and-groove joint between said contiguous extensions, substantially as and for the purpose specified.

9. In ball-bearings, a series of steel casing-rings, metallic bands inclosing the outer faces and edges thereof, a series of steel journal-rings, metallic bands inclosing the inner faces and edges thereof, balls between the steel rings, and a ball-retainer to space the balls between the rings having absorbent material in the retainer for oiling the balls as shown and described.

10. In ball-bearings, a ball-retainer composed of flat tubular rings having holes in the same to seat the balls, absorbent material in said tubes to lubricate the balls, and studs to hold the retainer on the balls.

11. In ball-bearings, a ball-retainer composed of flat metal rings having holes to seat the balls, absorbent material secured to said rings, a backing for holding the absorbent material against the balls, and studs to hold the retainer against the balls, as shown and for the purpose described.

In testimony whereof we affix our signatures in presence of two witnesses.

MILO HARRIS.
JOHN F. DEARING.

Witnesses:
  O. N. RUSHWORTH,
  C. A. WHEELER.